United States Patent
Segura Puchades

(10) Patent No.: US 11,706,540 B2
(45) Date of Patent: Jul. 18, 2023

(54) EVENT-DRIVEN IMAGE SENSOR AND METHOD OF READING THE SAME

(71) Applicant: Commissariat à l'Energie Atomique et aux Energies Alternatives, Paris (FR)

(72) Inventor: Josep Segura Puchades, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 17/301,563

(22) Filed: Apr. 7, 2021

(65) Prior Publication Data

US 2021/0337150 A1    Oct. 28, 2021

(30) Foreign Application Priority Data

Apr. 28, 2020    (FR) ..................................... 2004206

(51) Int. Cl.
*H04N 25/75* (2023.01)
*H04N 25/76* (2023.01)

(52) U.S. Cl.
CPC ............. *H04N 25/75* (2023.01); *H04N 25/76* (2023.01)

(58) Field of Classification Search
CPC ........ H04N 5/378; H04N 5/374; H04N 5/341; H04N 5/3742; H04N 5/369
See application file for complete search history.

(56) References Cited

U.S. PATENT DOCUMENTS

| | | | |
|---|---|---|---|
| 2007/0079035 A1* | 4/2007 | Ruedi | H04N 5/341 348/E3.018 |
| 2014/0125994 A1 | 5/2014 | Kim et al. | |
| 2016/0057366 A1 | 2/2016 | Lee et al. | |
| 2017/0094250 A1* | 3/2017 | Williams | H04N 13/156 |
| 2018/0091747 A1* | 3/2018 | Rhee | G01S 3/784 |
| 2018/0191972 A1* | 7/2018 | Berner | H04N 5/3741 |
| 2019/0052820 A1* | 2/2019 | Berner | H04N 25/75 |
| 2019/0289230 A1* | 9/2019 | Berner | H04N 5/379 |

(Continued)

FOREIGN PATENT DOCUMENTS

EP    1772808 A1    4/2007

OTHER PUBLICATIONS

Preliminary Search Report for French Application No. 2004206 dated Dec. 21, 2020, 2 pages.

(Continued)

*Primary Examiner* — Sinh Tran
*Assistant Examiner* — Zhenzhen Wu
(74) *Attorney, Agent, or Firm* — Moreno IP Law LLC

(57) ABSTRACT

The present disclosure relates to an event-driven sensor comprising: a pixel array (102); a column readout circuit (104) comprising, for each of the column output lines, a column register cell (108) configured to activate a column event output signal (addrx) when it receives a first token while the detection of an event is indicated on the column output line; and a row readout circuit (106) comprising, for each of the row output lines, or for each of a plurality of sub-groups of the row output lines, a row register cell (108) configured to activate a row event output signal (addry) when it receives a second token while an event is indicated on the row output line, or on one of the row output lines of the sub-group.

13 Claims, 12 Drawing Sheets

(56) References Cited

U.S. PATENT DOCUMENTS

2020/0412988 A1* 12/2020 Hiro .................. H04N 5/357
2021/0258525 A1*  8/2021 Matolin ............... H04N 5/378
2021/0409637 A1* 12/2021 Sakakibara ........ H04N 5/37457

OTHER PUBLICATIONS

F. Fahim et al., "A Low Power, High Speed Readout for Pixel Detectors based on an Arbitration Tree," IEEE Transactions on Very Large Scale Integration (VLSI) Systems, vol. 28, No. 2, pp. 576-584, Feb. 2020.

* cited by examiner

EVENT-DRIVEN IMAGE SENSOR AND METHOD OF READING THE SAME

FIELD

The present disclosure relates generally to the field of sensor arrays for image or depth detection, and in particular to an event-driven pixel array and to a method of reading the same.

BACKGROUND

Image sensors comprising arrays of imaging pixels are capable of detecting illumination from an image scene, and of temporarily storing, at each pixel, an electrical signal (often a quantity of charge) that is representative of the detected illumination. The signals stored at the pixels are generally read out from the entire array row by row in a synchronous manner.

A drawback of such a readout approach is that it is relatively time and energy consuming, particularly for large pixel arrays. Furthermore, in many applications, particularly those involving some level of scene tracking, there may be relatively long periods during which there is nothing of interest to be captured, and/or there may be only one or several relatively small regions of interest within the pixel array at any given time. Event-driven pixel arrays aim to provide significant gains in terms of speed and energy consumption for such applications.

In an event-driven image sensor, each pixel is capable of signaling to the readout circuitry surrounding the array when it has detected an event. The readout circuitry should then determine the pixel coordinates of the pixel that detected the event, and in some cases readout a value stored in the pixel or elsewhere.

A problem is that the implementations of event-driven sensors in the prior art are relatively complex, meaning that the gains in energy efficiency and speed are far from optimal.

SUMMARY

There is a need in the art for an improved event-driven pixel array and method of reading the same that at least partially addresses one or more problems in the prior art.

According to one embodiment, there is provided an event-driven sensor comprising: a pixel array; a column readout circuit coupled to column output lines of the pixel array, the column readout circuit comprising, for each of the column output lines, a column register cell coupled to the column output, the column register cells being coupled in series with each other to propagate a first token, wherein each column register cell is configured to activate a column event output signal when it receives the first token while the detection of an event is indicated on the column output line; and/or a row readout circuit coupled to row output lines of the pixel array, the row readout circuit comprising, for each of the row output lines, or for each of a plurality of sub-groups of the row output lines, a row register cell coupled to the row output line or lines, the row register cells being coupled in series with each other to propagate a second token, wherein each row register cell is configured to activate a row event output signal when it receives the second token while an event is indicated on the row output line, or on one of the row output lines of the sub-group.

According to one embodiment, the column output lines are column readout request lines, the column readout circuit being further coupled to acknowledgement column lines of the pixel array, and wherein the row output lines are row readout request lines, the row readout circuit being further coupled to acknowledgement row lines of the pixel array.

According to one embodiment, a first pixel of the array is configured to assert, in response to a detected event, either: a column readout request on the column readout request line of the column of the first pixel, and to assert a row readout request on the row readout request line of the row of the first pixel in response to an acknowledgement signal on the acknowledgement column line; or a row readout request on the row readout request line of the row of the first pixel, and to assert a column readout request on the column readout request line of the column of the first pixel in response to an acknowledgement signal on the acknowledgement column line.

According to one embodiment, the first pixel of the array is further configured to deactivate the column and row readout requests in response to the acknowledgement signals being asserted on the acknowledgement column and row lines.

According to one embodiment, each column output line is a shared column output line coupled to each of the pixels of its column, and each row output line is a shared row output line coupled to each of the pixels of its row.

According to one embodiment, each column output line is coupled in a daisy-chain to each of the pixels of its column, and each row output line is coupled in a daisy-chain to each of the pixels of its row.

According to one embodiment, the row readout circuit comprises, for each of the plurality of sub-groups of the row output lines, a row register cell coupled to the row output lines of the sub-group, the row readout circuit further comprising a pattern generation circuit configured to generate a bit pattern indicating the row of the sub-group on which the event occurred.

According to a further aspect, there is provided a method of reading out an event from a pixel of an event-driven sensor, the method comprising: propagating, through a series of column register cells of a column readout circuit, a first token, wherein the column readout circuit is coupled to column output lines of a pixel array of the sensor, the column readout circuit comprising, for each column output line, one of the column register cells coupled to the column output line; activating, by one of the column register cells, a column event output signal when it receives the first token while an event is indicated on the column output line; and, before or after the propagation of the first token and the activation of the column event output signal: propagating, through a series of row register cells of a row readout circuit, a second token, wherein the row readout circuit is coupled to row output lines of the pixel array, the row readout circuit comprising, for each row output line, one of the row register cells coupled to the row output line; and activating, by one of the row register cells, a row event output signal when it receives the second token while an event is indicated on the row output line.

According to one embodiment, the column output lines are column readout request lines, the column readout circuit being further coupled to acknowledgement column lines of the pixel array, and wherein the row output lines are row readout request lines, the row readout circuit being further coupled to acknowledgement row lines of the pixel array.

According to one embodiment, the method further comprises asserting, by a first pixel of the array in response to a detected event, either: a column readout request on the column readout request line of the column of the first pixel, and a row readout request on the row readout request line of the row of the first pixel in response to an acknowledgement signal on the acknowledgement column line; or a row readout request on the row readout request line of the row of the first pixel, and a column readout request on the column readout request line of the column of the first pixel in response to an acknowledgement signal on the acknowledgement column line.

According to one embodiment, the method further comprises deactivating, by the first pixel of the array, the column and row readout requests in response to the acknowledgement signals being asserted on the acknowledgement column and row lines.

According to one embodiment, the row readout circuit comprises, for each of the plurality of sub-groups of the row output lines, a row register cell coupled to the row output lines of the sub-group, the method further comprising generating, by a pattern generation circuit of the row readout circuit, a bit pattern indicating the row of the sub-group on which the event occurred.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, some embodiments described herein relate to image sensors, such as RGB (red, blue, green) sensors, and others to so-called depth sensors based on time-of-flight. The technical implementation of both of these types of sensors is well known to those skilled in the art, and has not been described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
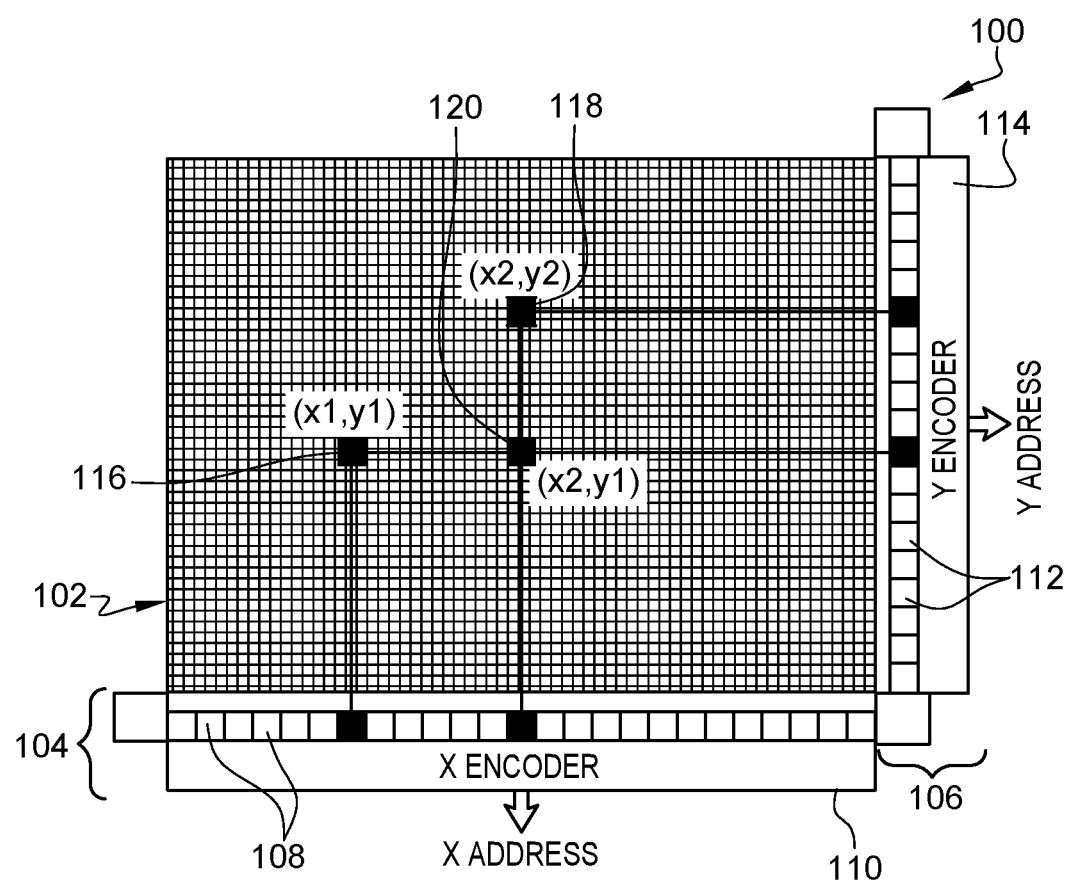
FIG. 1 schematically illustrates an event-driven sensor.

FIG. 1 schematically illustrates an event-driven sensor 100, comprising an array 102 of pixels arranged in columns and rows, a column readout circuit 104 and a row readout circuit 106.

The column readout circuit 104 comprises a column event detection circuit 108 for each column, and a column encoder (X ENCODER) 110 coupled to the column event detection circuits 106 that provides column addresses (X ADDRESSES).

The row readout circuit 106 comprises a row event detection circuit 112 for each column, and a row encoder (Y ENCODER) 114 coupled to the row event detection circuits 112 that provides row addresses (Y ADDRESSES).

Three pixels 116, 118 and 120 of the pixel array 102 are represented in FIG. 1, these pixels being respectively at addresses (x1,y1), (x2, y2) and (x2, y1). Thus, the pixel 120 is in the same row as the pixel 116, and in the same column as the pixel 118. A challenge in an event-driven sensor is to be able to avoid address conflicts and thereby correctly encode the pixel address of an event when more than one pixel in the same column and/or same row signals an event at the same time. Indeed, if the pixels 116 and 118 at the addresses (x1, y1) and (x2, y2) both signal an event at the same time, there is a risk that the address (x2, y1) of pixel 120 will be erroneously indicated as the coordinates of either or both of the events.

To address this issue, according to embodiments of the present disclosure, a handshake protocol is for example implemented between the pixels and the column and row readout circuits 104, 106, and a token-based priority scheme is for example implemented by each of the readout circuits 104, 106, as will now be described in more detail with reference to FIGS. 2 to 8.

Figure 2A:
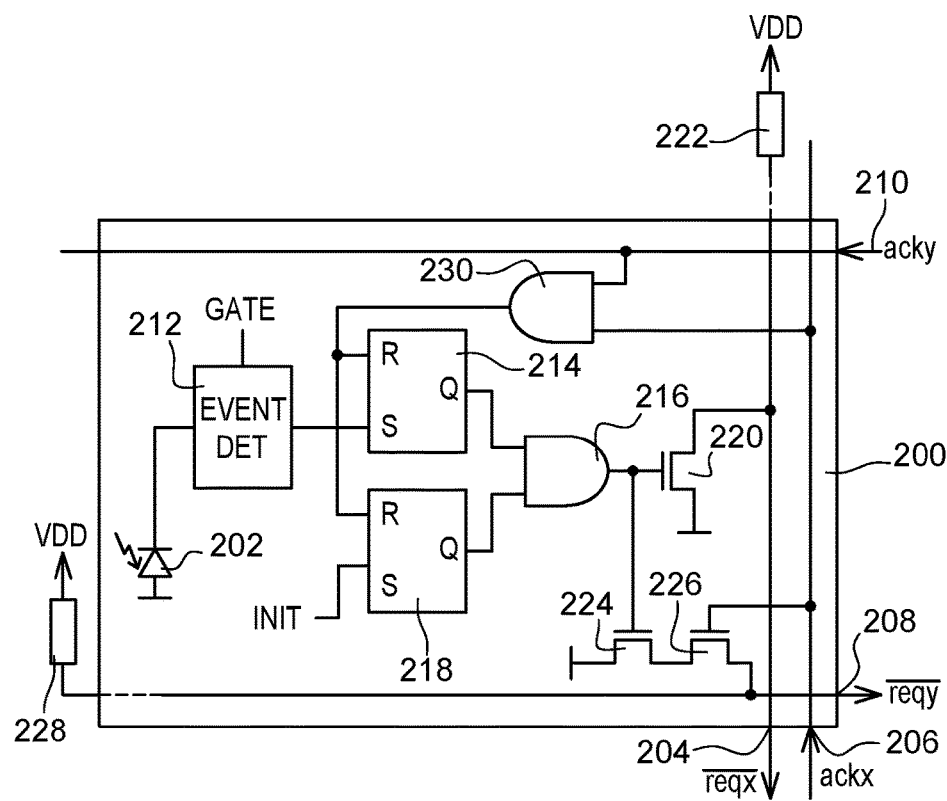
FIG. 2A schematically illustrates a pixel of an event-driven sensor according to an example embodiment of the present disclosure.

FIG. 2A schematically illustrates a pixel 200 of an event-driven sensor, such as the array 100 of FIG. 1, according to an example embodiment of the present disclosure.

The pixel 200 for example comprises a light-sensitive device 202, which is represented as a photodiode in the example of FIG. 2A. More generally, the device 202 is any device that generates an electrical signal as a function of the light that it receives from an image scene. For example, the device 202 could be a pinned photodiode or a SPAD (single-photon avalanche diode), or a more complex device that outputs an analog or digital output signal, such as a voltage or current representing light intensity, a photon count value, etc.

The pixel 200 is for example coupled to shared column lines 204 and 206, and shared row lines 208 and 210. The shared column lines 204, 206 are for example coupled to at least two, and generally to all, of the pixels of a column of the pixel array, and shared row lines 208, 210 are for example coupled to at least two, and generally to all, of the pixels of a row of the pixel array.

The shared column line 204 is for example a column readout request line over which the pixel 200 indicates when it detects an event by asserting a column request signal $\overline{reqx}$. The shared column line 206 is for example an acknowledgement line over which the pixel 200 receives a column acknowledgement signal ackx indicating that the request has been registered by a corresponding column event detection circuit (described in more detail below).

The shared row line 208 is for example a row readout request line over which the pixel 200 indicates when it has detected an event, and has received an acknowledgement ackx on the column acknowledge line 206, by asserting a request signal $\overline{reqy}$. The shared row line 210 is for example an acknowledgement line over which the pixel 200 receives a row acknowledgement signal acky indicating that the request has been registered by a corresponding row event detection circuit (described in more detail below).

The pixel 200 is for example configured to detect an event based on an electrical signal or value produced by the device 202, and to assert, in response, the request signal $\overline{reqx}$ on the line 204. The pixel 200 is then for example configured to detect when the acknowledgement signal ackx is asserted on the line 206, and to assert, in response, the request signal $\overline{reqy}$ on the line 208. The pixel 200 is then for example configured to detect when the acknowledgement signal acky is asserted on the line 210, and to reinitialize, in response, its event detection mechanism.

For performing these functions, the pixel 200 for example comprises an event detection circuit (EVENT DET) 212, having an input coupled to the device 202, and an output coupled to a memory circuit 214. The event detection circuit 212 is for example activated by a signal GATE, which is for example a common signal for all the pixels of the array. The memory circuit 214 is configured to store an event-detection state at its output Q until the event has been registered by the column and row event detection circuits. In some embodiments, the memory circuit 214 is implemented by an SR (set-reset) flip-flop, wherein the set input S of the flip-flop 214 receives the output of the event detection circuit 212. However, other implementations based on any bi-stable device would be possible.

In some embodiments, the output of the memory circuit 214 is coupled to one input of an AND gate 216, the other input of which is coupled to the output of a further memory circuit 218. The further memory circuit for example receives, at an input, a signal INIT, indicating when the pixel circuit 200 is to become active and thus capable of signaling events to the readout circuits. In some embodiments, the memory circuit 218 is implemented by an SR flip-flop 218 receiving the signal INIT at its set input S.

The output of the AND gate 216 for example activates a switch 220 that is configured to assert the request signal $\overline{reqx}$. In some embodiments, the request signal $\overline{reqx}$ is active low, and the switch 220 is implemented by a transistor, such as an n-channel MOS (NMOS) transistor, having its gate coupled to the output of the AND gate 216, and coupling, via its main conducting nodes, the line 204 to ground. In such a case, the line 204 is for example coupled, at one edge of the pixel array, to a supply voltage VDD via a resistor 222. Of course, it would be equally possible for the line 204 to be active high, by replacing NMOS transistors by PMOS transistors, and inverting their respective digital input command.

The output of the AND gate 216 also for example causes the request signal $\overline{reqy}$ to be asserted on the line 208 when the acknowledgement signal ackx on the line 206 is asserted. For example, the request signal $\overline{reqy}$ is asserted when two switches 224, 226 are activated, the switch 224 being activated by the output of the AND gate 216, and the switch 226 being activated by the acknowledgement signal ackx. In some embodiments, the request signal $\overline{reqy}$ is active low, and the switches 224, 226 are coupled in series with each other between the line 208 and ground. For example, the switches 224, 226 are implemented by transistors, such as NMOS transistors, coupled in series via their main conducting nodes, the switch 224 having its gate coupled to the output of the AND gate 216, and the switch 226 having its gate coupled to the line 206. In such a case, the line 208 is for example coupled, at one edge of the pixel array, to the supply voltage VDD via a resistor 228. Of course, it would be equally possible for the line 208 to be active high, by replacing NMOS transistors by PMOS transistors, and inverting their respective digital input command.

The reinitialization of the event detection mechanism in the pixel 200 is for example performed by an AND gate 230, which for example has one of its inputs coupled to the acknowledgement line 206, the other of its inputs coupled to the acknowledgement line 210, and its output coupled to the memory circuits 214, 218 in order to reset their states. In the case that the memory circuits 214, 218 are SR flip-flips, the output of the AND gate 230 is for example coupled to the reset input R of these flip-flops.

The signal INIT is for example a global signal for all pixels of the array. However, in some embodiments it would also be possible for the signal INIT to be common for the pixels of rows and/or columns of the pixel array, but independent between rows and/or columns. This would for example permit a sub-region of the pixel array to be defined as a region of interest, leading to a faster readout of this sub-region. In the case that the INIT signal is both row and column based, this would also for example permit a set of individual pixels to be selected in order to avoid reading out noisy or defective sensors. In such a case, an additional AND gate driving the S input of the flip-flop 218 is for example added to each pixel. Its inputs would be connected to column and row lines driven by X and Y peripheral circuits, such as shift registers. An activation sequence for selected pixels would for example be performed before running the image acquisition.

In alternative embodiments, the pixel 200 is always active, and thus no initialization signal INIT is provided. In such embodiments, the memory circuit 218 and the AND gate 216 could be omitted, the switches 220 and 224 for example being controlled directly by the Q output of the memory circuit 214.

The pixel 200 is for example capable of detecting an event, and of requesting the readout of this event detection state. Additionally, in some embodiments, the pixel 200 could be further configured to output a detected value, such as a light intensity value, or photon count, in addition to the event detection state. In such a case, an output to an additional shared column or row line is for example provided from each pixel in order to permit this signal to be output.

Figure 2B:
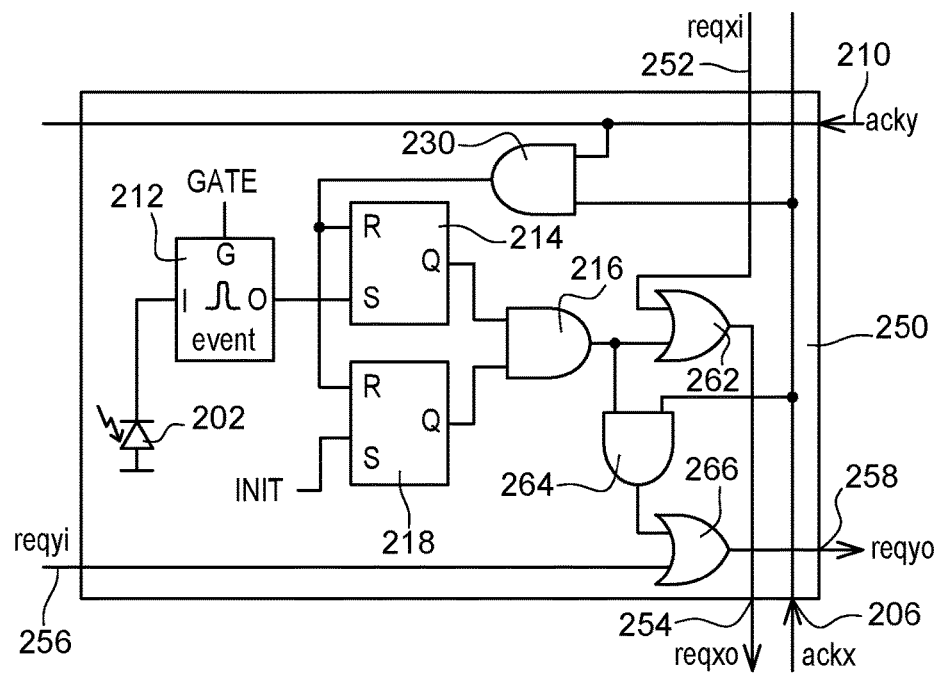
FIG. 2B schematically illustrates a pixel of an event-driven sensor according to a further example embodiment of the present disclosure.

FIG. 2B schematically illustrates a pixel 250 of an event-driven sensor, such as the array 100 of FIG. 1, according to an alternative embodiment to that of FIG. 2A. The embodiment of FIG. 2B has certain features in common with the embodiment of FIG. 2A, and these features have been labelled with like reference numerals and will not be described again in detail.

In the example of FIG. 2B, the request line 204 is replaced by an input request line 252 receiving a signal reqxi from an adjacent pixel of the column above the pixel 250, and an output request line 254 sending a signal reqxo to an adjacent pixel of the column below the pixel 250. The pixel at the top of the column for example has its request input line 252 coupled to a 0 V ground rail. Similarly, the request line 208 is replaced by an input request line 256 receiving a signal reqyi from an adjacent pixel of the row to the left of the pixel 250, and an output request line 258 sending a signal reqyo to an adjacent pixel of the row to the right of the pixel 250. The pixel at the far left of the row for example has its request input line 256 coupled to a 0 V ground rail.

Thus, in the example of FIG. 2B, the request lines are daisy-chained along each of the rows and columns of pixels.

Furthermore, in the example of FIG. 2B, the transistors 220, 224 and 226 are replaced by an OR gate 262, an AND gate 264 and an OR gate 266. The OR gate 262 receives at one of its inputs the output of AND gate 216, and at the other of its inputs the input request signal reqxi on the line 252. An output of the OR gate 262 provides the output request signal reqxo on the line 254.

The AND gate 264 has one of its inputs coupled to the output of AND gate 216, and the other of its input coupled to the acknowledgement line 206. The output of the AND gate 264 is coupled to one input of the OR gate 266. The other input of OR gate 266 receives the input request signal reqyi on the line 256. An output of the OR gate 266 provides the output request signal reqyo on the line 258.

Operation of the pixel 250 is similar to that of the pixel 200 of FIG. 2A. Indeed, when a column request signal reqxo or a row request signal reqyo is asserted by any pixel, this request signal will be conveyed to the end of the column or row via any intermediate pixels.

Figure 3:
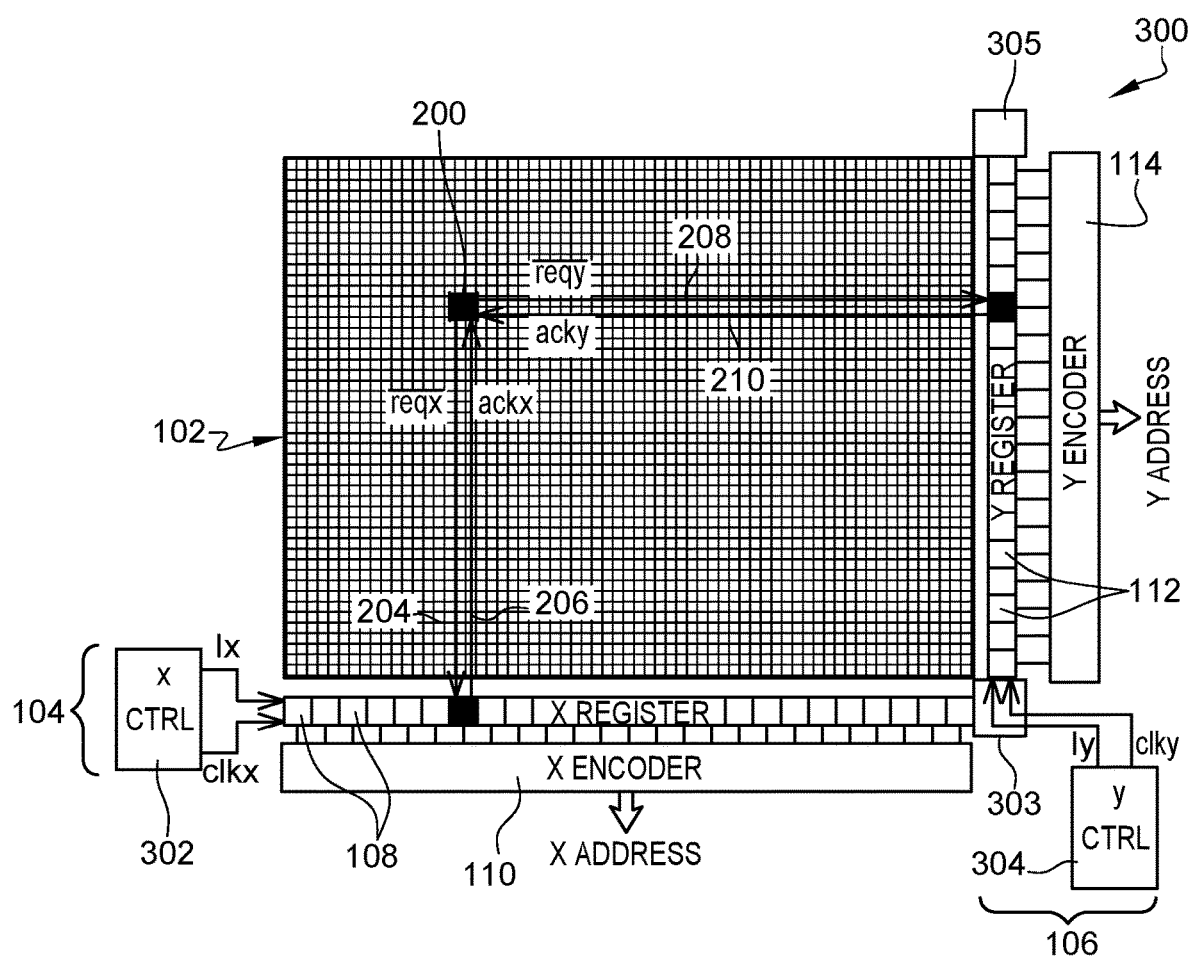
FIG. 3 schematically illustrates an event-driven sensor according to an example embodiment of the present disclosure.

FIG. 3 schematically illustrates an event-driven sensor 300 according to an example embodiment of the present disclosure. The sensor 300 for example comprises some features in common with the array 100 of FIG. 1, and like features have been labelled with like reference numerals.

In the embodiment of FIG. 3, the column readout circuit 104 comprises column event detection circuits 108 implemented by register cells forming a column register (X REGISTER), an output of each of the circuits 108 being provided to the column encoder (X ENCODER) 110. Furthermore, the column readout circuit 104 for example comprises a control circuit (x CTRL) 302 that provides a token signal Ix and a clock signal clkx to the column event detection circuits 108. The circuits 108 are for example coupled in series with each other, and are configured to propagate a token represented by the token signal Ix from one end to the other end of the series-connected circuits 108. The clock signal clkx is for example provided to each of the circuits 108. In some embodiments, an end-of-scan detection circuit 303 detects when a token is released by the last detection circuit 108 of the series, such that a new token can be injected again at the start of the series.

Similarly, the row readout circuit 106 for example comprises row event detection circuits 112 implemented by register cells forming a row register (Y REGISTER), an output of each of the circuits 112 being provided to the row encoder (Y ENCODER) 114. Furthermore, the row readout circuit 106 for example comprises a control circuit (y CTRL) 304 that provides a token signal Iy and a clock signal clky to the row event detection circuits 112. For example, the token signal Iy is generated in response to the signal $\overline{reqx}$ being generated in any of the columns, which is for example detected by an OR tree (not illustrated) based on the signals $\overline{reqx}$ or the signals addrx of the column readout circuit 106. The circuits 112 are for example coupled in series with each other, and are configured to propagate a token represented by the token signal Iy from one end to the other end of the series-connected circuits 112. The clock signal clky is for example provided to each of the circuits 112. In some embodiments, an end-of-scan detection circuit 305 detects when a token is released by the last detection circuit 112 of the series, such that a new token is ready to be injected again at the start of the series.

The array 102 of pixels of FIG. 3 for example comprises the pixels 200 of FIG. 2A, one of which is illustrated in FIG. 3, coupled by the request and acknowledgement lines 204, 206 to a corresponding column event detection circuit 108 of its column, and by the request and acknowledgement lines 208, 210 to a corresponding row event detection circuit 112 of its row. As explained in relation with FIG. 2A, the request and acknowledgement lines 204, 206 are for example shared among the pixels of each column, and thus there are for example as many request lines 204, and as many acknowledgement lines 206, as columns in the array. Similarly, the request and acknowledgement lines 208, 210 are for example shared among the pixels of each row, and thus there are for example as many request lines 208, and as many acknowledgement lines 210, as rows in the array.

While FIG. 3 illustrates an example in which the column and row readout circuits 104, 106 are positioned at the edges of the array, in alternative embodiments, these circuits could for example be position elsewhere, such as in a separate tier in the case of a stacked 3D image sensor. In particular, the array 102 of pixels, or at least the sensor 202 of each pixel, and possibly the event detector 212, could for example be implemented in one tier optimized for detection, and the remaining circuits, including the readout circuits, could be implemented in another tier containing mostly digital circuits and optimized for speed.

Figure 4:
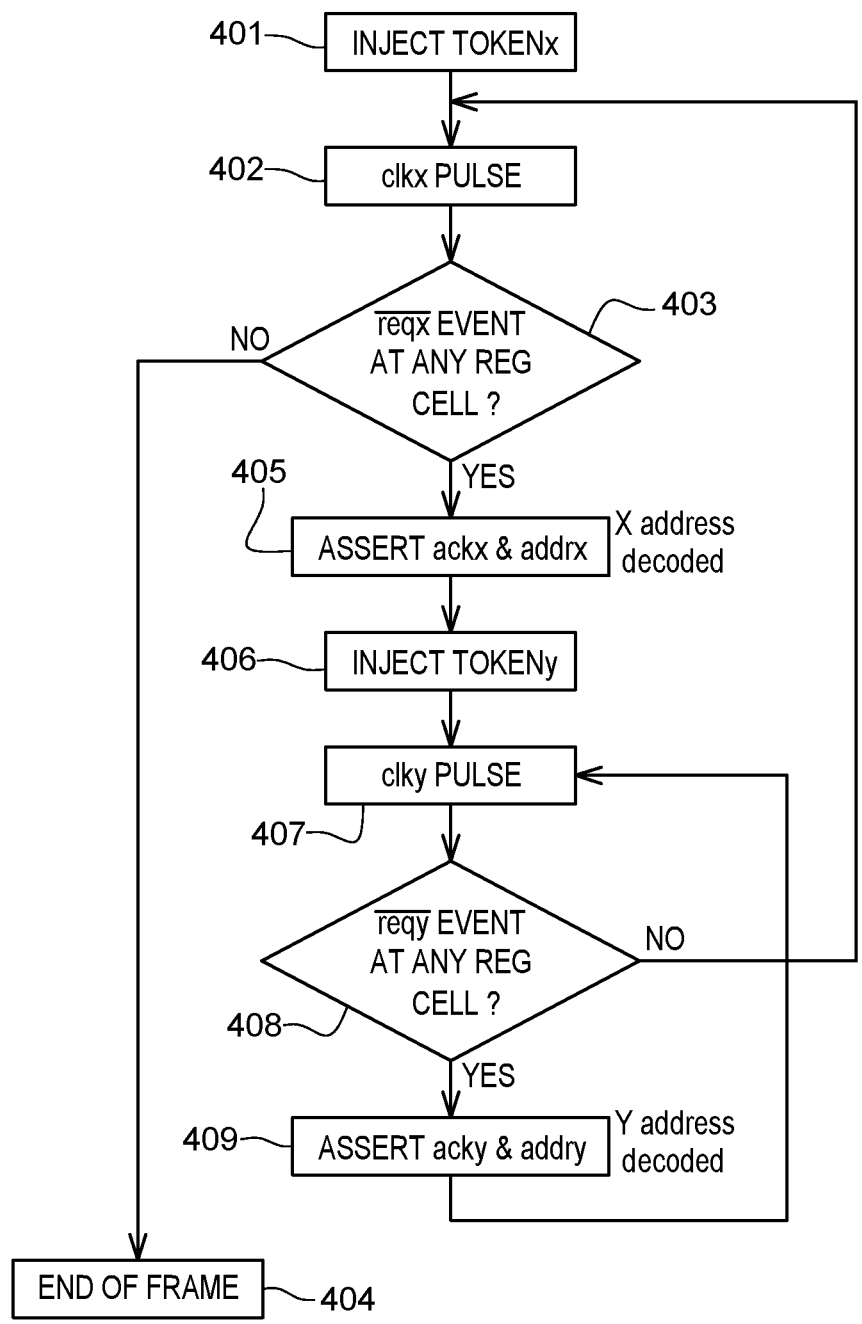
FIG. 4 is a flow diagram representing operations in a method of reading pixels in the event-driven sensor of FIG. 3.

FIG. 4 is a flow diagram representing operations in a method of reading pixels in the event-driven sensor of FIG. 3. This method is for example implemented at least partially by hardware, and in particular by the pixel circuit of FIG. 2A or 2B and by the column and row readout circuits 104, 106 of FIG. 3. In some cases, the control circuits 302, 304 may be implemented entirely in hardware, for example by state machines, while in alternative embodiments these circuits could be implemented at least partially by software executed by one or more processors, such as by a microprocessor.

In an operation 401, the control circuit 302 for example injects a token TOKENx into the series of register cells 108.

In an operation 402, there is a pulse of the clock signal clkx.

In an operation 403, it is determined whether there is an event of the $\overline{reqx}$ signal at any of the register cells 108 that has not yet been processed. If not, this implies that the end of the image frame has been reached, as represented by a block 404. If, however, there is at least one event, then the next operation is an operation 405.

In operation 405, the first register cell 108 of the X register at which an event is detected asserts the acknowledgement signal ackx on the acknowledgement line 206. Furthermore, the signal addrx is for example asserted by this register cell, such that the x encoder generates a corresponding x address.

Then, in an operation 406, the control circuit 304 for example injects a token TOKENy into the series of register cells 112.

In an operation 407, there is a pulse of the clock signal clky.

In an operation 408, it is determined whether there is an event of the $\overline{reqy}$ signal at any of the register cells 112. If not, this means that the Y scan has finished, and the method for example returns to operation 402 in which a new clock pulse of the clock clkx occurs. If, however, there is at least one event, then the next operation is an operation 409.

In operation 409, the first register cell 112 of the Y register at which an event is detected asserts the acknowledgement signal acky on the acknowledgement line 210. Furthermore, the signal addry is for example asserted by this register cell, such that the y encoder generates a corresponding y address. The method then for example returns to operation 407, and this loop is repeated until there are no further $\overline{reqy}$ events to be read.

Thus, each read cycle is for example launched by the injection of a token TOKENx and the occurrence of a pulse of the clock clkx. Once a read cycle has ended at the end of frame 404, a new read cycle may be launched immediately, or after a delay. For example, read cycles may be launched periodically, such as once every 10 milliseconds, in order to detect whether any event has occurred in the image scene. Alternatively, read cycles may be executed back to back, without any wait period between cycles.

Figure 5:
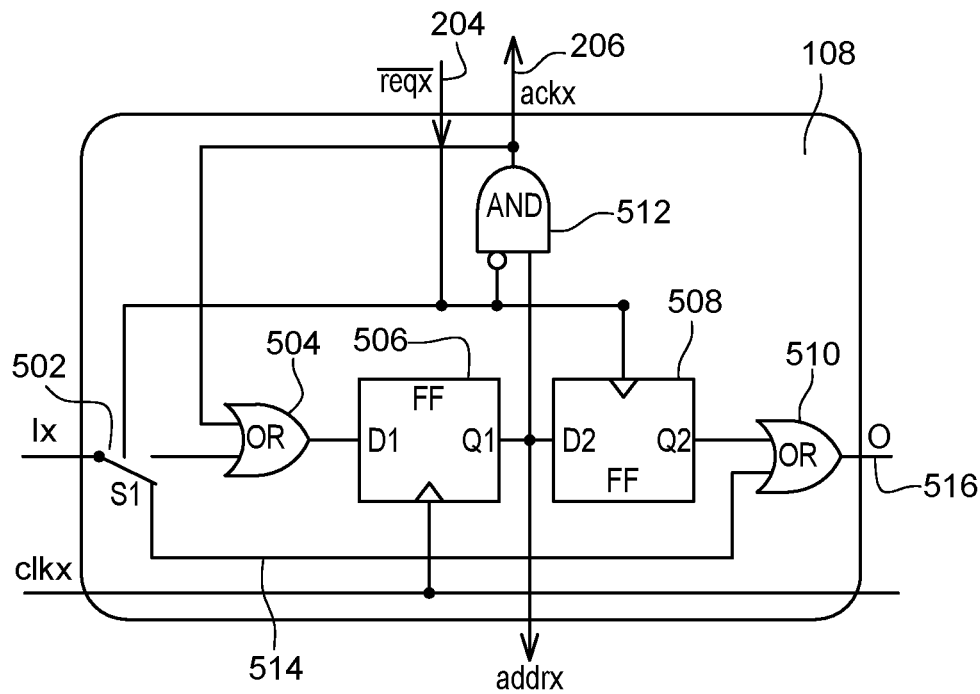
FIG. 5 schematically illustrates a column register of FIG. 3 in more detail according to an example embodiment.

FIG. 5 schematically illustrates a register cell 108 of FIG. 3 in more detail according to an example embodiment.

Each of the register cells 108 for example comprises a three-way switch 502, also known as an SPDT (Single Pole Double Throw), an OR gate 504, synchronous memory devices 506 and 508 implemented for example by flip-flops, an OR gate 510, and an AND gate 512.

The three-way switch 502 is for example implemented by a demultiplexer, and receives at its input the signal Ix either directly from the control circuit 302 in the case of the first circuit register of the series, or, in the case of the other register cells in the series, via one or more of the other register cells. The switch 502 selectively supplies the signal Ix to either an input of the OR gate 504, or via a bypass path 514 to an input of the OR gate 510. The switch 502 is for example controlled by the line 204, and in particular, when the request signal $\overline{reqx}$ is high, indicating an absence of a column event, the switch 502 for example supplies the signal Ix to the bypass path 514, and when the request signal $\overline{reqx}$ is low, indicating the presence of a column event, the switch 502 for example supplies the signal Ix to the OR gate 504.

The output of the OR gate 504 is for example coupled to a data input D1 of the flip-flop 506, which is for example a D-type flip-flop. The data output Q1 of the flip-flop 506 is for example coupled to the data input D2 of the flip-flop 508, which is for example also a D-type flip-flop. The data output Q2 of the flip-flop 508 is for example coupled to another input of the OR gate 510. The flip-flop 506 is for example clocked by the clock signal clkx, and the flip-flop 508 is for example clocked by the signal $\overline{reqx}$ on the line 204.

The output Q1 of the flip-flop 506 is further coupled to one input of the AND gate 512, the other input of which receives, at an inverted input, the request signal $\overline{reqx}$ on the line 204. The output of the AND gate 512 provides the acknowledgement signal ackx on line 206, and this signal is also provided to the other input of the OR gate 504.

The output Q1 of the flip-flop 506 also for example provides an output signal addrx of the circuit 108, indicating when an event has been detected in the column of pixels of the register cell 108. This signal enables the column decoder 110 of FIG. 3 to generate an x address of the pixel or pixels that detected an event.

An output 516 of the OR gate 510 provides the signal Ix to the next register cell 108 of the series, or in the case of the final register cell 108 of the series, to the end-of-scan detection circuit 303.

Figure 6:
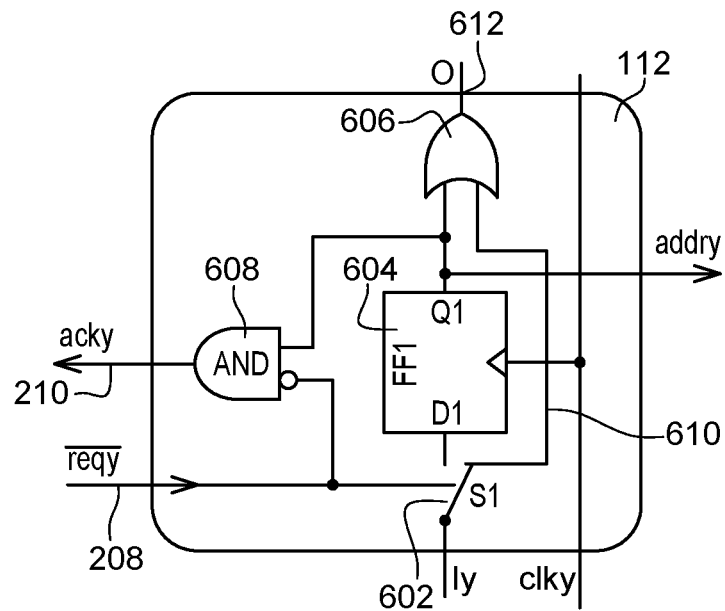
FIG. 6 schematically illustrates a row register of FIG. 3 in more detail according to an example embodiment.

FIG. 6 schematically illustrates a row register cell 112 of FIG. 3 in more detail according to an example embodiment.

Each of the register cells 112 for example comprises a three-way switch 602, a synchronous memory device 604 implemented for example by a flip-flop, an OR gate 606, and an AND gate 608.

The three-way switch 602 is for example implemented by a demultiplexer, and receives at its input the signal Iy either directly from the control circuit 304 in the case of the first register cell of the series, or, in the case of the other register cells in the series, via one or more of the other register cells. The switch 602 selectively supplies the signal Iy to either the data input D1 of the flip-flop 604, which is for example a D-type flip-flop, or via a bypass path 610 to an input of the OR gate 606. The switch 602 is for example controlled by the line 208, and in particular, when the request signal $\overline{reqy}$ 15 high, indicating an absence of a row event, the switch 602 for example supplies the signal Iy to the bypass path 610, and when the request signal $\overline{reqy}$ 15 low, indicating the presence of a row event, the switch 602 for example supplies the signal Iy to the flip-flop 604.

The data output Q1 of the flip-flop 604 is for example coupled to another input of the OR gate 606. The flip-flop 604 is for example clocked by the clock signal clky.

The output Q1 of the flip-flop 604 is further coupled to one input of the AND gate 608, the other input of which receives, at an inverted input, the request signal $\overline{reqy}$ on the line 208. The output of the AND gate 608 provides the acknowledgement signal acky on line 210.

The output Q1 of the flip-flop 604 also for example provides an output signal addry of the circuit 108, indicating when an event has been detected in the row of pixels of the register cell 108. This signal enables the row decoder 114 of FIG. 3 to generate a y address of the pixel that detected an event.

An output 612 of the OR gate 606 provides the signal Iy to the next register cell 112 of the series, or in the case of the final register cell 112 of the series, to the end-of-scan detection circuit 305.

The register cells 108 and 112 of FIGS. 5 and 6 provide at least part of the implementation of the method of FIG. 4, and permit, in particular, for address conflicts to be avoided when there are events in two pixels of a same column or row, as will now be described in more detail with reference to FIGS. 7 and 8.

Figure 7:
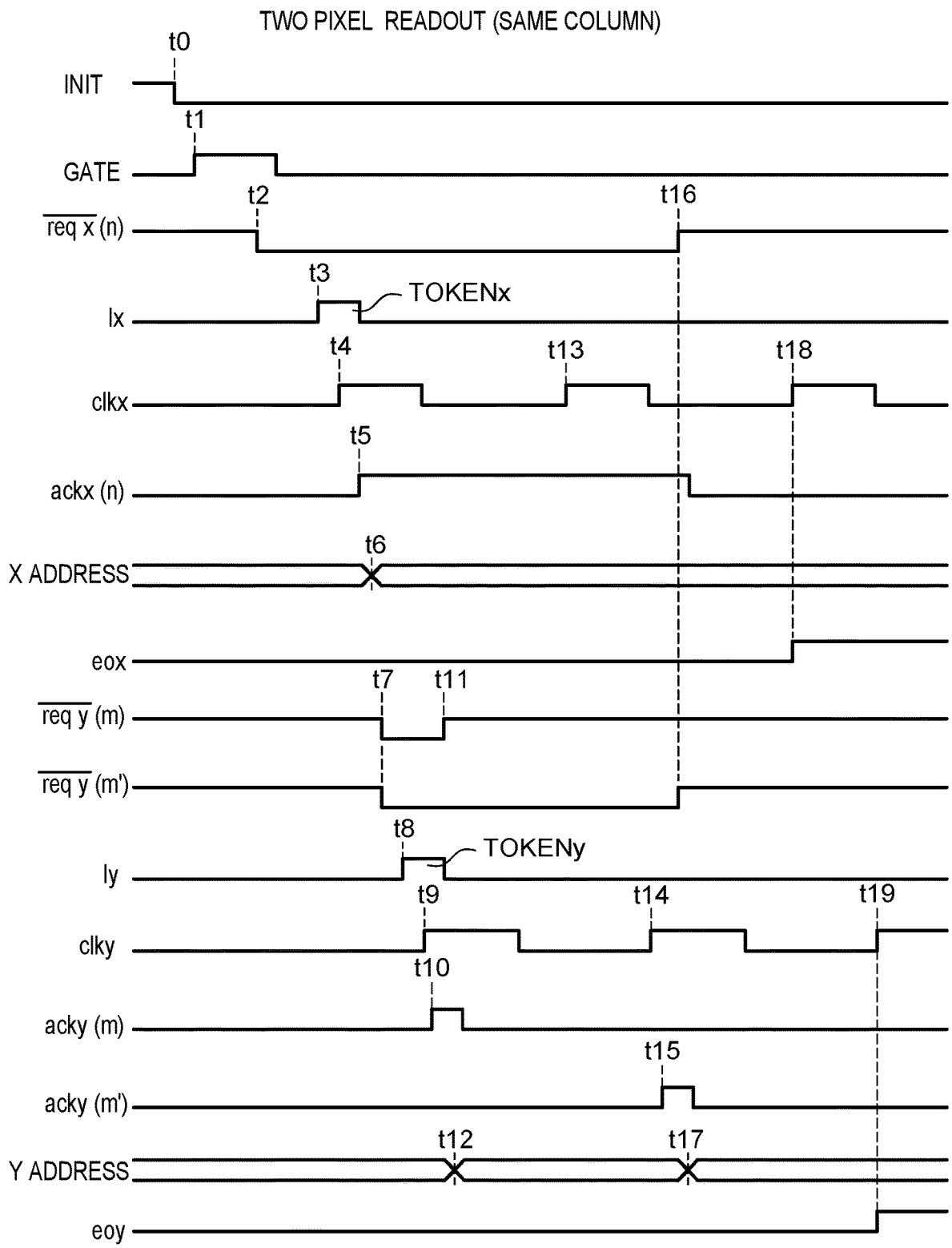
FIG. 7 is a timing diagram illustrating an example of reading two pixels in a same column of the sensor of FIG. 3.

FIG. 7 is a timing diagram illustrating an example of reading two pixels in a same column of the sensor of FIG. 3. FIG. 7 illustrates examples of the signals INIT, GATE, the request signal $\overline{reqx}(n)$ for an nth column, Ix, clkx, ackx, X ADDRESS, an end of x scan signal eox, the request signal $\overline{reqy}(m)$ for an mth row, the request signal $\overline{reqy}(m')$ for an m'th row, Iy, clky, the acknowledgement signal acky(m) for an mth row, the acknowledgement signal acky(m') for an m'th column, Y ADDRESS and an end of y scan signal eoy.

The signal INIT for example goes low at a time t0 to activate the pixels of the pixel array, and the signal GATE for example has a high pulse starting at a time t1 to activate event detection. At a time t2, an event is detected by a pixel of the nth column, indicated by the signal $\overline{reqx}(n)$ falling low. Sometime later, a read cycle is initiated, starting with an x scan. In particular, the signal Ix comprises a pulse starting at a time t3 corresponding to the token TOKENx, causing the output of OR gate 504 (see FIG. 5) to go high. The clock signal clkx has a rising edge at a time t4, which causes the output of the OR gate 504 to be stored at the output Q1 of the flip-flop 506, and thus the acknowledgement signal ackx goes high at a time t5. Furthermore, the address encoder receives the signal addrx, and thus generates the x address X ADDRESS at a time t6.

The acknowledgement signal ackx causes a pixel of an mth row of the nth column to assert the request signal $\overline{reqy}(m)$ at a time t7, and also another pixel of an m'th row of the nth column to assert the request signal $\overline{reqy}(m')$ at substantially the same time t7. Sometime later, a y scan of the read cycle starts. In particular, the signal Iy comprises a pulse starting at a time t8 corresponding to the token TOKENy, causing the data input of the flip-flop 604 (see FIG. 6) to go high. The clock signal clky has a rising edge at a time t9, which causes the output of the flip-flop 604 to go high, and thus the acknowledgement signal acky(m) of the mth column goes high shortly thereafter, at a time t10. The rise of the acknowledgement signal acky(m) will cause the pixel of the nth column and mth row to bring high the request signal $\overline{reqy}(m)$ at a time t11. Furthermore, the signal addry (see FIG. 6) of the mth row will be asserted, and the Y encoder 114 will thus generate the y address Y ADDRESS at a time t12.

At about the same time as the rising edge of the request signal $\overline{reqy}(m)$ at the time t11, the pixel in the nth column and mth row will release the request signal $\overline{reqx}(n)$, but this signal remains low due to the second pixel in the nth column that has yet to be read out. Therefore, at a next rising edge of the clock signal clkx at a time t13, the token TOKENx remains at the register cell 108 of the nth column.

At a subsequent rising edge of the clock signal clky at a time t14, the token TOKENy will propagate to the register cell 112 of the m'th row, and thus the acknowledgment signal acky(m') is asserted at the time t15. The rise of the acknowledgement signal acky(m') will cause the pixel of the nth column and m'th row to bring high the request signals $\overline{reqy}(m')$ and $\overline{reqx}(n)$ at a time t16, and the acknowledgement signals ackx and acky will thus go low shortly thereafter. Furthermore, the signal addry (see FIG. 6) of the m'th row will be asserted, and the Y encoder 114 will thus generate the new y address Y ADDRESS at a time t17.

At a time t18, a subsequent rising edge of the clock signal clkx for example causes the token TOKENx to reach the end-of-scan detection circuit 303, and thus the end of x scan signal eox is for example asserted. This signal is for example provided to the x scan control circuit 302, in order to allow a subsequent x scan to be initiated.

Similarly, at a time t19, a subsequent rising edge of the clock signal clky for example causes the token TOKENy to reach the end-of-scan detection circuit 305, and thus the end of y scan signal eoy is for example asserted. This signal is for example provided to the y scan control circuit 304, in order to allow a subsequent y scan to be initiated.

Figure 8:
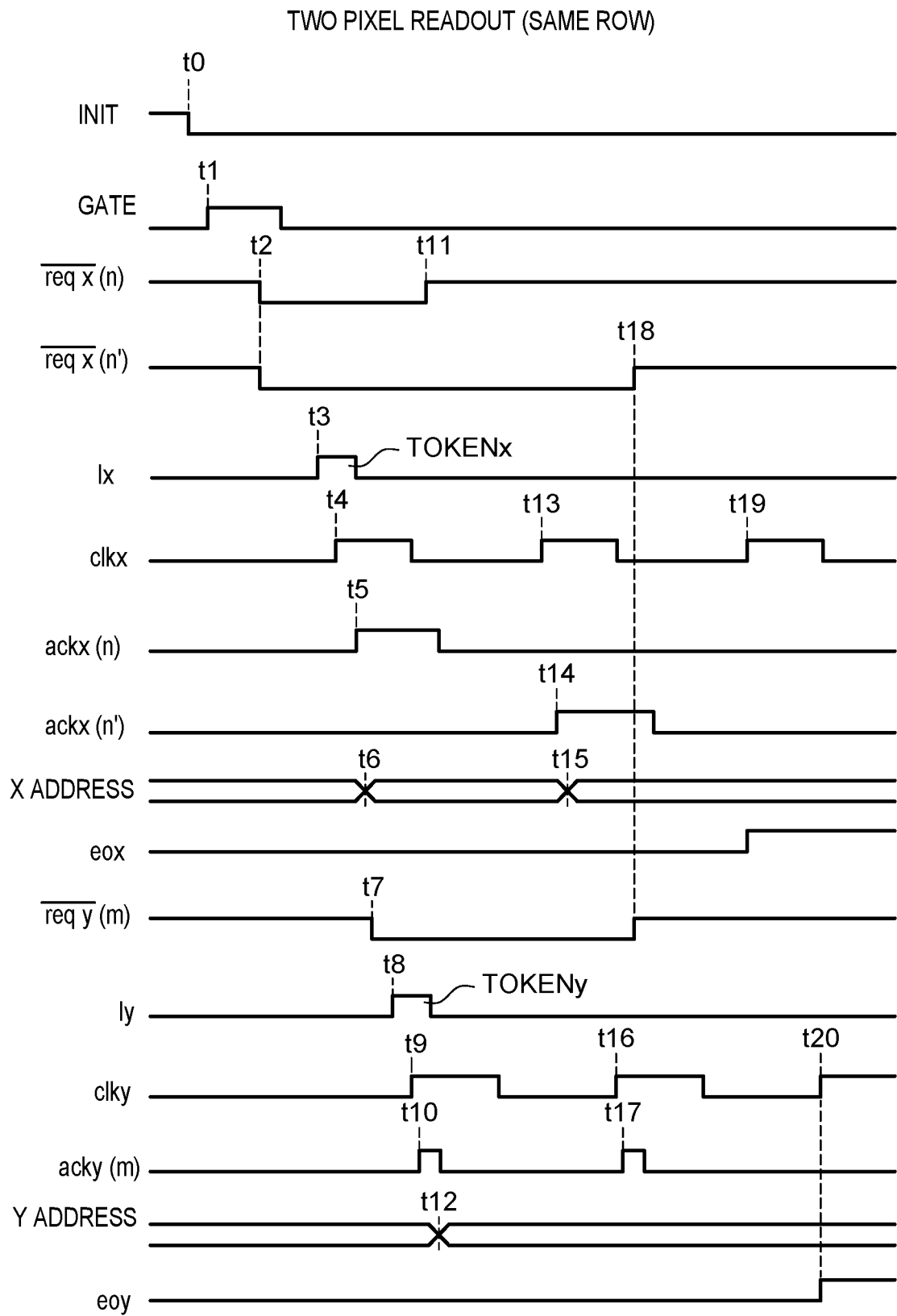
FIG. 8 is a timing diagram illustrating an example of reading two pixels in a same row of the sensor of FIG. 3.

FIG. 8 is a timing diagram illustrating an example of reading two pixels in a same row of the pixel array of the sensor of FIG. 3. FIG. 8 illustrates examples of the signals INIT, GATE, the request signal $\overline{reqx}(n)$ for an nth column, the request signal $\overline{reqx}(n')$ for an n'th column, Ix, clkx, the acknowledgement signal ackx(n) for an nth column, the acknowledgement signal ackx(n') for an n'th column, X ADDRESS, an end of x scan signal eox, the request signal $\overline{reqy}(m)$ for an mth row, Iy, clky, acky, Y ADDRESS and an end of y scan signal eoy.

The signal INIT for example goes low at a time t0 to activate the pixels of the pixel array, and the signal GATE for example has a high pulse starting at a time t1 to activate event detection. At a time t2, an event is detected by a pixel of the nth column, indicated by the signal $\overline{reqx}(n)$ falling low, and at around the same time, an event is detected by a pixel of the n'th column, indicated by the signal $\overline{reqx}(n')$ falling low. Sometime later, a read cycle is initiated, starting with an x scan. In particular, the signal Ix comprises a pulse starting at a time t3 corresponding to the token TOKENx, causing the output of OR gate 504 (see FIG. 5) to go high. The clock signal clkx has a rising edge at a time t4, which causes the output of the OR gate 504 to be stored at the output Q1 of the flip-flop 506, and thus the acknowledgement signal ackx(n) goes high at a time t5. Furthermore, the address encoder receives the signal addrx, and thus generates the x address X ADDRESS at a time t6.

The acknowledgement signal ackx causes a pixel of an mth row of the nth column to assert the request signal $\overline{reqy}(m)$ at a time t7. Sometime later, a y scan of the read cycle starts. In particular, the signal Iy comprises a pulse starting at a time t8 corresponding to the token TOKENy, causing the data input of the flip-flop 604 (see FIG. 6) to go high. The clock signal clky has a rising edge at a time t9, which causes the output of the flip-flop 604 to go high, and thus the acknowledgement signal acky(m) goes high shortly thereafter, at a time t10. The rise of the acknowledgement signal acky(m) will cause the pixel of the nth column and mth row to bring high the request signal $\overline{reqx}(n)$ at a time t11, and bring low the acknowledgement signal ackx(n), but the request signals $\overline{reqx}(n')$ and $\overline{reqy}(m)$ stay low, due to the second pixel in the mth row, which has yet to be read out. Furthermore, the signal addry (see FIG. 6) of the mth row will be asserted, and the Y encoder 114 will thus generate the y address Y ADDRESS at a time t12.

At a subsequent rising edge of the clock signal clkx at a time t13, the token TOKENx will propagate to the register cell 108 of the n'th row, and thus the acknowledgment signal ackx(n') is asserted at the time t14, and the address encoder receives the signal addrx, and thus generates the x address X ADDRESS at a time t15.

Sometime later, a y scan of the read cycle continues. In particular, because the request signal $\overline{reqy}(m)$ remained low, the token TOKENy is still at the register cell 112 of the mth row. At the next rising edge of the clock signal clky at a time t16, the output of the flip-flop 604 (see FIG. 6) will go high, and the acknowledgement signal acky(m) goes high shortly thereafter, at a time t17. The rise of the acknowledgement signal acky(m) will cause the pixel of the n'th column and mth row to bring high the request signals $\overline{reqy}(m)$ and $\overline{reqx}(n')$ at a time t18, and the acknowledgement signals ackx(n') and acky(m) will go low shortly thereafter.

At a time t19, a subsequent rising edge of the clock signal clkx for example causes the token TOKENx to reach the end-of-scan detection circuit 303, and thus the end of x scan signal eox is for example asserted. This signal is for example provided to the x scan control circuit 302, in order to allow a subsequent x scan to be initiated.

Similarly, at a time t20, a subsequent rising edge of the clock signal clky for example causes the token TOKENy to reach the end-of-scan detection circuit 305, and thus the end of y scan signal eoy is for example asserted. This signal is for example provided to the y scan control circuit 304, in order to allow a subsequent y scan to be initiated.

In image sensor applications, the signal GATE provided to the pixels for example allows a global shutter operation to be applied to the array.

In time-of-flight (ToF) applications, the signal GATE in the pixel can be used to set a distance range for detection, as will now be described in more detail with reference to FIG. 9.

Figure 9:
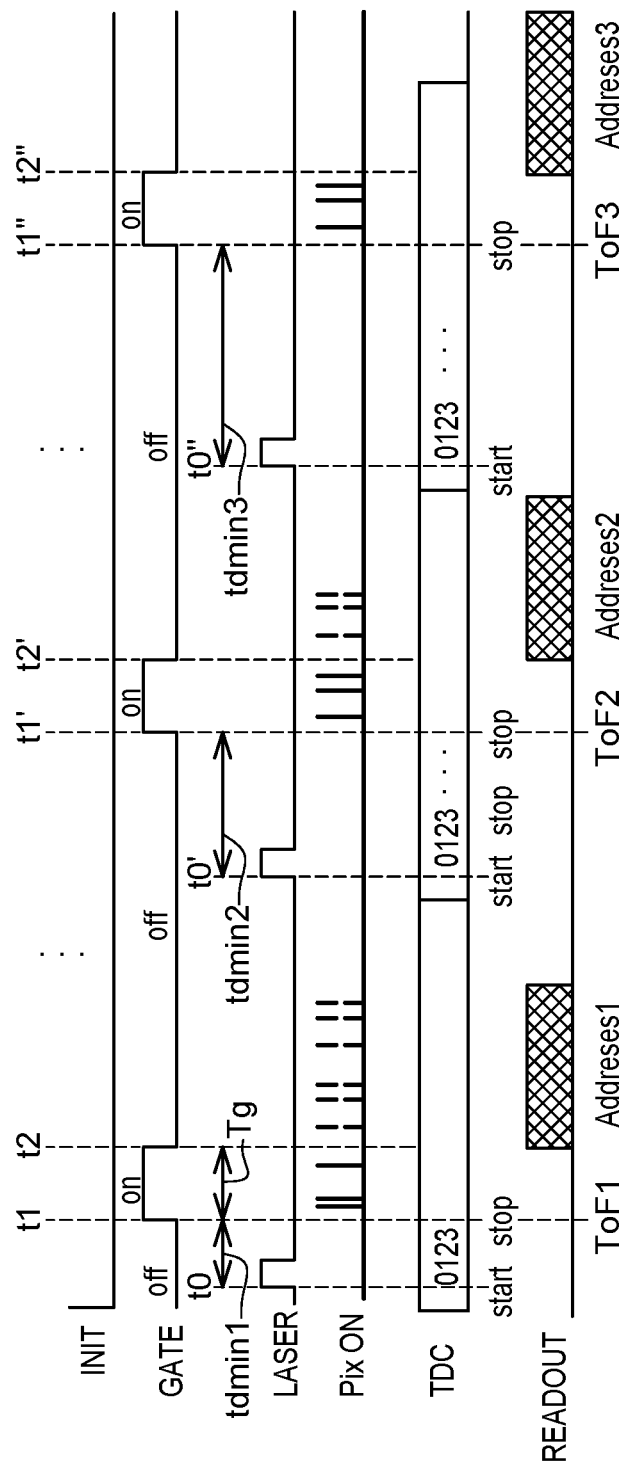
FIG. 9 is a timing diagram representing a time-of-flight pixel operation according to an example embodiment of the present disclosure.

FIG. 9 is a timing diagram representing a time-of-flight (ToF) pixel operation according to an example embodiment of the present disclosure. FIG. 9 illustrates examples of the signals INIT, GATE, a signal LASER corresponding to the timing of transmission of an optical pulse into the image scene, a signal Pix ON representing detected signals within some pixels, a signal TDC for controlling the GATE signal, and a signal READOUT.

In the example FIG. 9, the signal LASER goes high at a time t0, corresponding to the time that a laser pulse is transmitted into the image scene. This pulse will be reflected by any objects present in the image scene, and the return pulse captured by the light-sensitive devices 202 of the pixels of the pixel array. The distance of objects in the image scene will influence the time duration that it takes for the pulse to perform the round trip.

At a time t1, a high pulse of the signal GATE for example starts, this pulse having a duration Tg, and ending at a time t2. Thus, return pulses returning to any pixels before t1, or after t2, will not be detected by the pixel, and events will only be generated during the interval t1 to t2. This is represented in FIG. 9 by the signals Pix ON of pixels, where only those occurring during the interval t1 to t2 are detected as events. This permits the signal GATE to be used to implement a distance detection for objects within a certain distance range. The time duration tdmin1 between the time t0 and the time t1 sets the minimum distance at which objects will be detected. The duration Tg of the time interval sets the accuracy of the distance detection.

As represented in FIG. 9, the detection cycle may be repeated at times t0' and t0'', in combination with pulses of the signal GATE starting respectively at times t1' and t1'', and ending respectively at time t2' and t2''. Time durations tdmin2 and tdmin3 between the times t0' and t1' respectively and the times t0'' and t1'' are for example different to the duration tdmin1, allowing different distances to be detected. In this manner, it is for example possible to scan a relatively large distance range in the image scene over several cycles.

While in the embodiment of FIGS. 3 to 8 a full scan is performed in both x and y, in some embodiments, the y scan can be performed more quickly by combining rows, as will now be described in more detail with reference to FIGS. 10 to 12.

Figure 10:
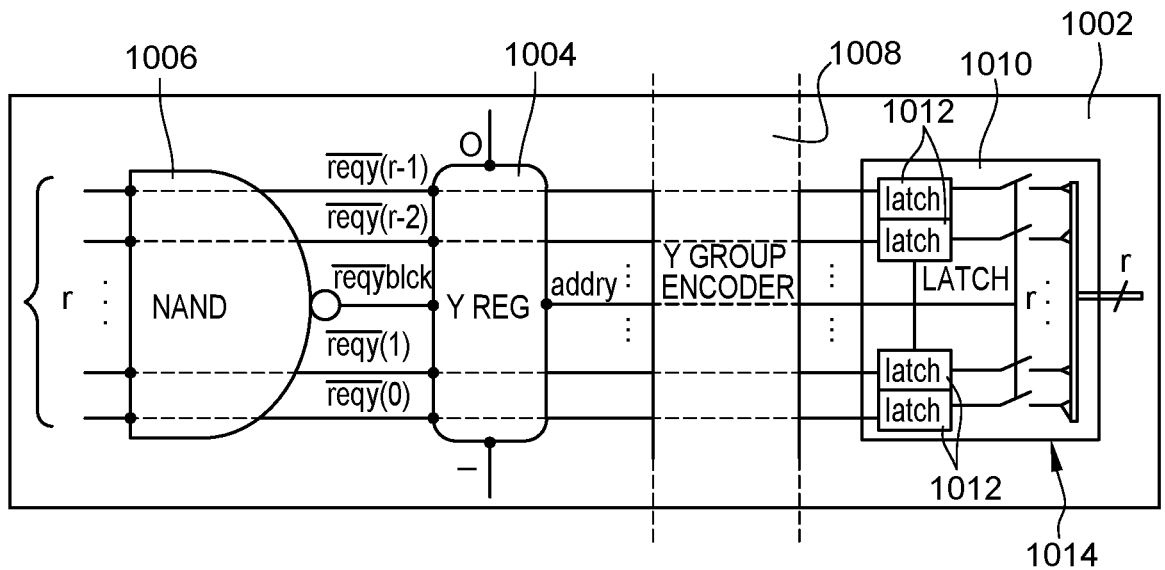
FIG. 10 schematically illustrates row readout circuitry according to an example embodiment of the present disclosure.

FIG. 10 schematically illustrates a sub-circuit 1002 of the row readout circuit 106 according to an example embodiment of the present disclosure. In this embodiment, the row readout circuit 106 for example comprises a plurality of the sub-circuits 1002. As illustrated in FIG. 10, each sub-circuit 1002 for example comprises a single register cell 1004 for a plurality of r rows of the pixel array. A NAND gate 1006 for example combines the request signals $\overline{reqy}(0)$ to $\overline{reqy}(r-1)$ from the r rows to generate a combined request signal reqyblck, which is provided to the register cell 1004 in addition to the request signals reqy(0) to reqy(r-1). The register cell 1004 generates a signal addry, which is similar to the signal generated by the register cells 112 of FIG. 3, except that it indicates an event at the sub-circuit level, and not at the row level. This signal is for example used by a y group encoder (Y GROUP ENCODER) of the row readout circuit 106 to generate the sub-circuit address. Furthermore, the sub-circuit 1002 comprises a further latch circuit 1010, which is for example used to generate, based on the request signals $\overline{reqy}(0)$ to $\overline{reqy}(r-1)$ and the signal addry, further bits of the y address, indicating the row of an event within the r rows. This circuit 1010 for example comprises latches 1012, each receiving a corresponding one of the request signal signals $\overline{reqy}(0)$ to $\overline{reqy}(r-1)$, the latches 1012 for example being clocked by the signal addry, and providing an r-bit output signal via switches 1014 indicating the row of the pixel event. The switches 1014 are for example also controlled by the signal addry.

Figure 11:
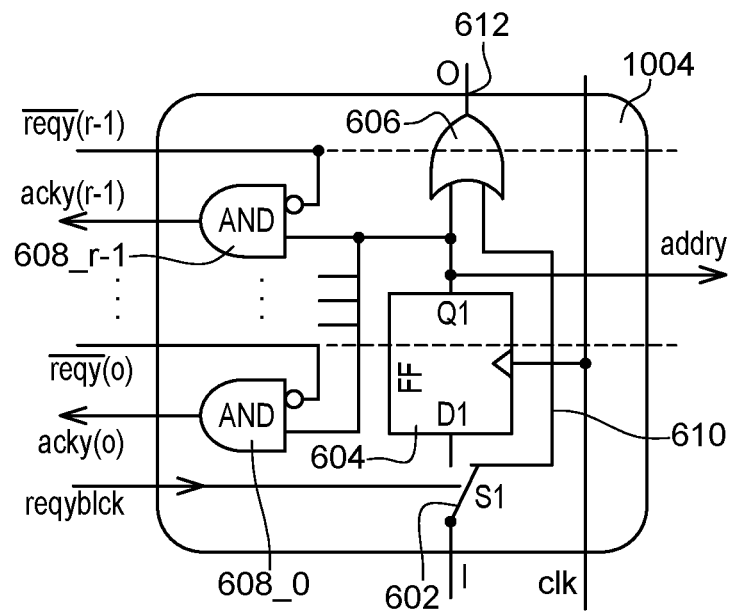
FIG. 11 schematically illustrates a row register of the row readout circuitry of FIG. 10 in more detail.

FIG. 11 schematically illustrates the register cell 1004 of FIG. 10 in more detail. This circuit is for example similar to the register cell 112 of FIG. 6, and like features are labelled with like reference numerals, and will not be described again in detail. However, in the embodiment of FIG. 11, there are r AND gates 608_0 to 608_r-1, each receiving, at an inverted input, a corresponding one of the request signals $\overline{reqy}(0)$ to $\overline{reqy}(r-1)$, and each generating a corresponding acknowledgement signal acky(0) to acky(r-1). Furthermore, the switch 602 is controlled by the combined request signal reqyblck.

Figure 12:
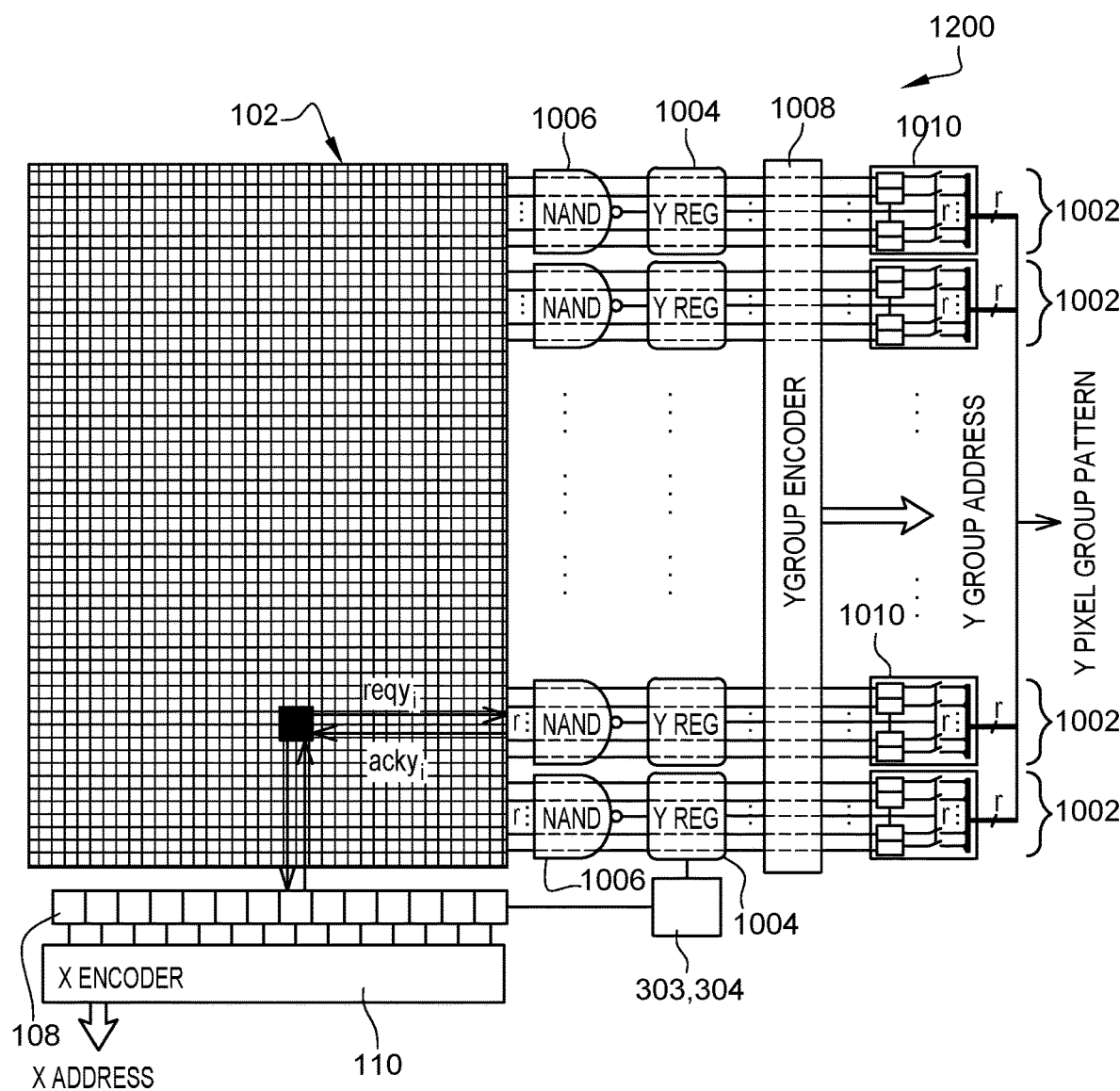
FIG. 12 schematically illustrates an event-driven sensor comprising the row readout circuitry of FIG. 10 according to an example embodiment of the present disclosure.

FIG. 12 schematically illustrates an event-driven sensor 1200 comprising the row readout circuitry of FIG. 10 according to an example embodiment of the present disclosure. As shown in FIG. 12, the x scan circuitry is for example the same as that of FIG. 3 (the control circuit 302 is not illustrated in FIG. 12), but the y scan circuit is replaced by the sub-circuits 1002 of FIG. 10, repeated a plurality of times.

Operation of the array 1200 of FIG. 12 will now be described with reference to FIG. 13.

Figure 13:
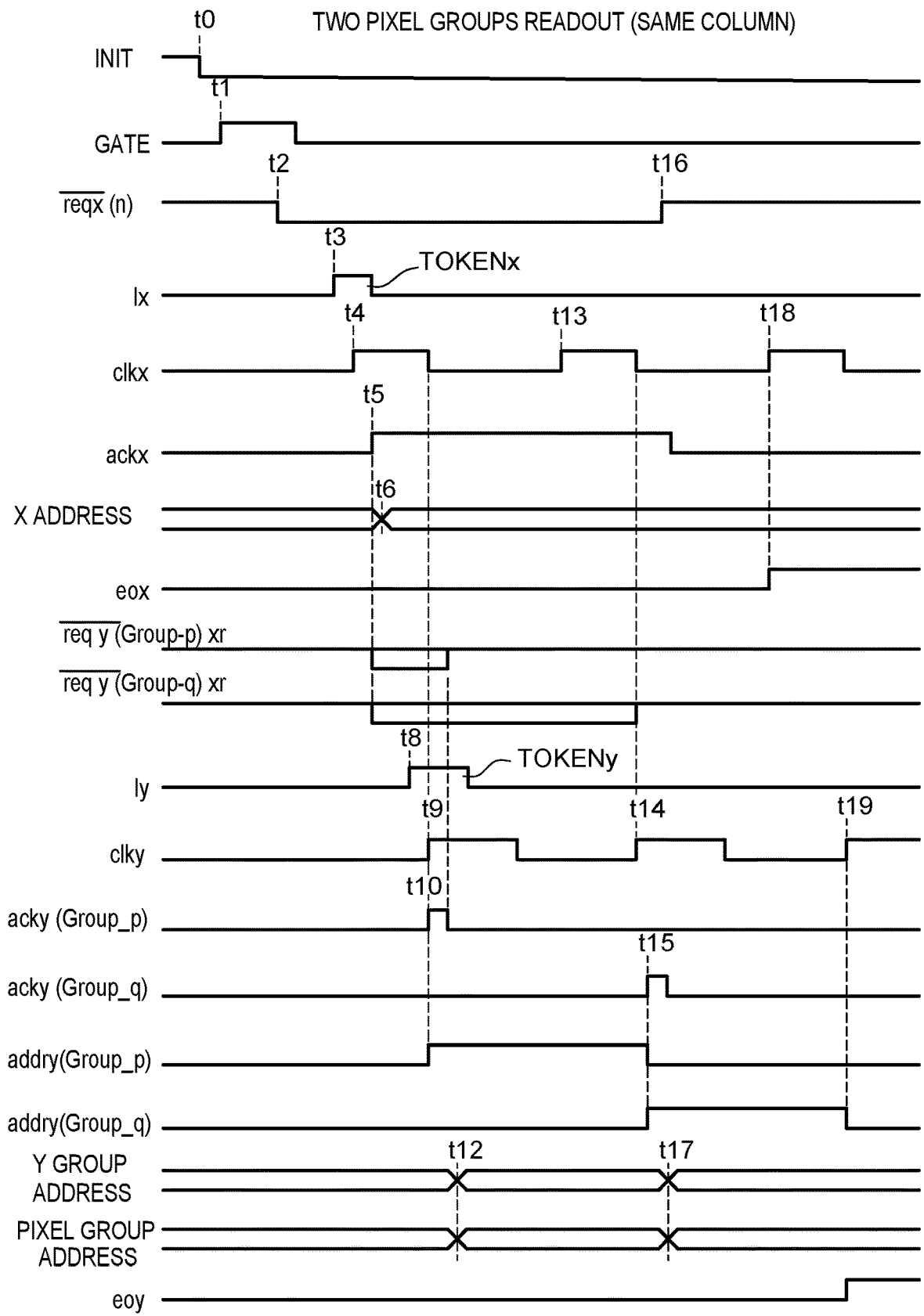
FIG. 13 is a timing diagram illustrating an example of reading two pixels in a same column of the sensor of FIG. 12.

FIG. 13 is a timing diagram illustrating an example of reading two pixels in a same column of the pixel array of FIG. 12. FIG. 13 illustrates examples of the signals INIT, GATE, the request signal $\overline{reqx}(n)$ for an nth column, Ix, clkx, ackx, X ADDRESS, eox, the request signal $\overline{reqy}(Group\_p)$ for a group p of r rows, the request signal $\overline{reqy}(Group\_q)$ for another group q of r rows, Iy, clky, the acknowledgement signal acky(Group_p) for the group p of r rows, the acknowledgement signal acky(Group_q) for the group q of r rows, Y ADDRESS and an end of y scan signal eoy.

The timing diagram of FIG. 13 is similar to that of FIG. 7, and the aspects that are the same will not be described again in detail. However, in the example of FIG. 13, when a pixel in one row of the group p of rows is read, the signal addry (Group p) of the group is asserted, and two values are generated. One value is the y group address (Y GROUP ADDRESS) generated by the Y group encoder 1008, indicating the address of the group p. The other value is a pattern (Y PIXEL GROUP PATTERN) indicating the position of the one or more activated rows within the group p, corresponding to the row or rows of the pixel(s) being read. Similarly, when a pixel in one row of the group q of rows is read, the signal addry (Group q) of the group is asserted, and again two values are generated, the y group address indicating the address of the group q, and the pixel group pattern, indicating the position of the one or more activated rows within the group q, corresponding to the row or rows of the pixel(s) being read.

In some embodiments, the read speed can be increased further by dividing the array 102 of pixels, and providing separate register cells and encoders operating in parallel, as will now be described with reference to FIG. 14.

Figure 14:
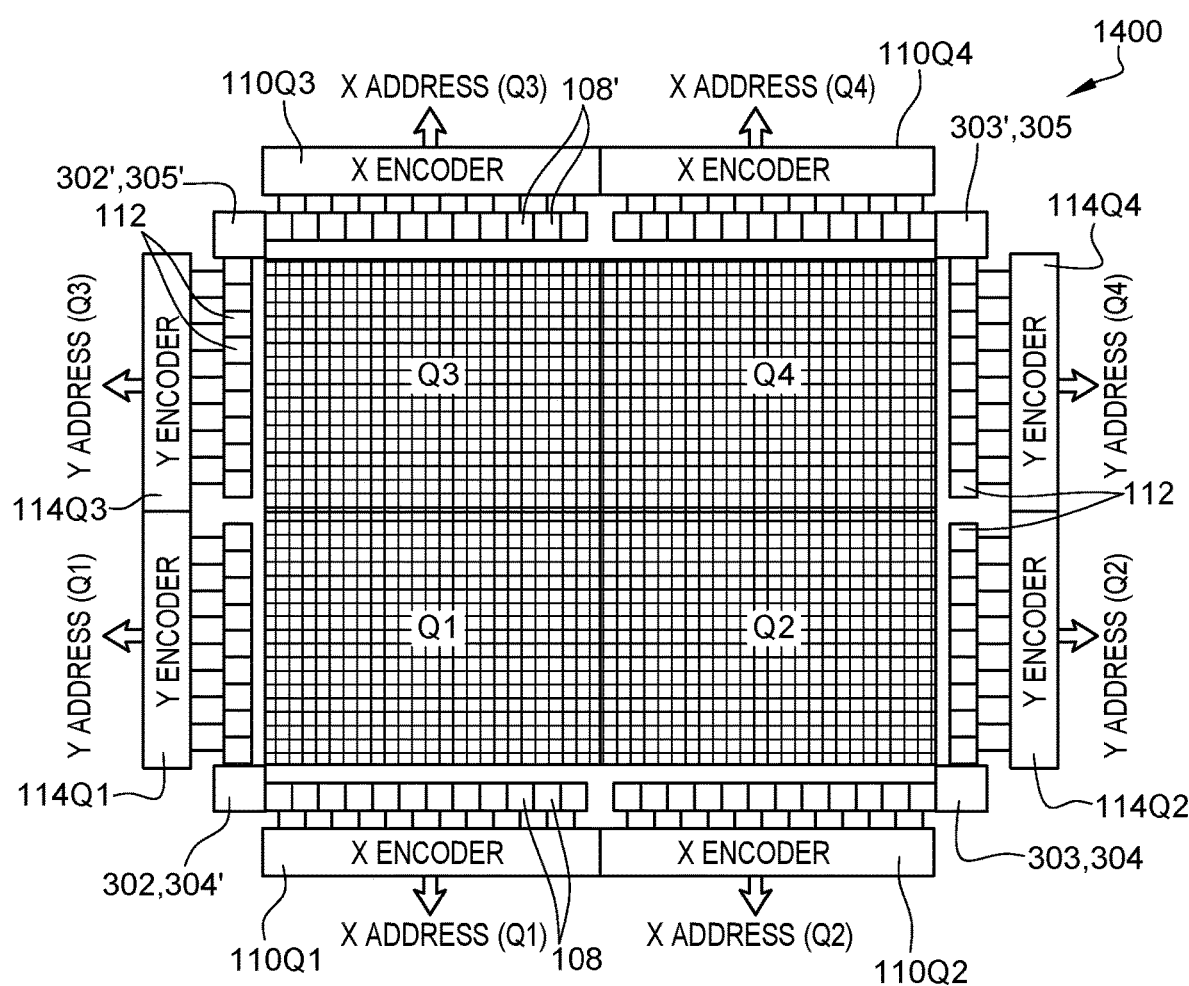
FIG. 14 schematically illustrates an event-driven sensor according to yet a further example embodiment of the present disclosure.

FIG. 14 schematically illustrates an event-driven sensor 1400 according to yet a further example embodiment of the present disclosure, in which the array 102 of pixels is divided into four regions of Q1, Q2, Q3 and Q4 of substantially equal size, and corresponding for example to quadrants of the pixel array. Each quadrant for example has a dedicated X and Y encoder and corresponding readout systems, these elements being labelled in FIG. 14 with the same reference numerals as those used in FIG. 3, but with the postscript "Q1", "Q2", "Q3" and "Q4" to designate the quadrant to which they belong. Thus, four scans, one for each of the four quadrants, can be performed simultaneously in the embodiment of FIG. 14, leading to four times the read speed.

An advantage of the embodiments described herein is that the solutions provide a simple and fast solution for reading out column and row addresses of pixel events while avoiding address conflict. In particular, the solution is not based on an arbiter tree, which is a relatively bulky circuit used in some prior art approaches. The solution also has the advantage of being synchronous, one address for example being read out during every clock period of the clocks clkx, clky. Furthermore, it has been found that very high readout speeds can be obtained as the clock speed can be at 100 MHz or more, and in the case of FIG. 12, the maximum readout speed is equal to the r times the clock frequency.

Various embodiments and variants have been described. Those skilled in the art will understand that certain features of these embodiments can be combined and other variants will readily occur to those skilled in the art. For example, it will be apparent to those skilled in the art that the embodiment of FIG. 14 could be used in conjunction with the circuit of FIG. 10.

Further still, it will be apparent to those skilled in the art that while embodiments have been described in which each pixel is configured to assert the column readout request signal first in response to the detection of an event, and in response to the column acknowledgement signal, to assert the row readout request signal, it would also be possible for each pixel to start by the row readout request, and in response to the row acknowledgement signal, to assert the column readout request.

Furthermore, while embodiments have been described that use X and Y encoders to generate addresses, alternative implementations, particularly in the case of relatively small arrays, could instead involve the use of one or more external counters to count the number of '0' among the addrx and addry signals before the first '1' is found, this count value therefore indicating the position of the event in the X or Y register, and thus the address.

What is claimed is:

1. An event-driven sensor comprising:
   a pixel array;
   a column readout circuit coupled to column output lines of the pixel array, the column readout circuit comprising, for each of the column output lines, a column register cell coupled to the column output line, the column register cells being coupled in series with each other to propagate a first token, wherein each column register cell is configured to activate a column event output signal when it receives the first token while an event is indicated on the column output line; and
   a row readout circuit coupled to row output lines of the pixel array, the row readout circuit comprising, for each of a plurality of sub-groups of the row output lines, a row register cell coupled to a plurality of the row output lines via a logic gate configured to combine row event signals on the plurality of the row output lines to generate a combined row event signal, the row register cells being coupled in series with each other to propagate a second token, wherein each row register cell is configured to activate a row event output signal when it receives the second token while an event is indicated by the combined row event signal of the sub-group.

2. The event-driven sensor of claim 1, wherein the column output lines are column readout request lines, the column readout circuit being further coupled to acknowledgement column lines of the pixel array, and wherein the row output lines are row readout request lines, the row readout circuit being further coupled to acknowledgement row lines of the pixel array.

3. The event-driven sensor of claim 2, wherein a first pixel of the array is configured to assert, in response to a detected event, either:
   a column readout request on the column readout request line of the column of the first pixel, and to assert a row readout request on the row readout request line of the row of the first pixel in response to an acknowledgement signal on the acknowledgement column line; or
   a row readout request on the row readout request line of the row of the first pixel, and to assert a column readout request on the column readout request line of the column of the first pixel in response to an acknowledgement signal on the acknowledgement column line.

4. The event-driven sensor of claim 3, wherein the first pixel of the array is further configured to deactivate the column and row readout requests in response to the acknowledgement signals being asserted on the acknowledgement column and row lines.

5. The event-driven sensor of claim 1, wherein each column output line is a shared column output line coupled to each of the pixels of its column, and each row output line is a shared row output line coupled to each of the pixels of its row.

6. The event-driven sensor of claim 1, wherein each column output line is coupled in a daisy-chain to each of the pixels of its column, and each row output line is coupled in a daisy-chain to each of the pixels of its row.

7. The event-driven sensor of claim 1, the row readout circuit further comprising a pattern generation circuit configured to generate a bit pattern indicating the row of the sub-group on which the event occurred.

8. A method of reading out an event from a pixel of an event-driven sensor, the method comprising:
   propagating, through a series of column register cells of a column readout circuit, a first token, wherein the column readout circuit is coupled to column output lines of a pixel array of the sensor, the column readout circuit comprising, for each column output line, one of the column register cells coupled to the column output line;
   activating, by one of the column register cells, a column event output signal when it receives the first token while an event is indicated on the column output line; and, before or after the propagation of the first token and the activation of the column event output signal:

propagating, through a series of row register cells of a row readout circuit, a second token, wherein the row readout circuit is coupled to row output lines of the pixel array, the row readout circuit comprising, for each of a plurality of sub-groups of the row output lines, one of the row register cells coupled to a plurality of the row output lines via a logic gate configured to combine row event signals on the plurality of the row output lines to generate a combined row event signal; and activating, by one of the row register cells, a row event output signal when it receives the second token while an event is indicated by the combined row event signal of the sub-group.

9. The method of claim 8, wherein the column output lines are column readout request lines, the column readout circuit being further coupled to acknowledgement column lines of the pixel array, and wherein the row output lines are row readout request lines, the row readout circuit being further coupled to acknowledgement row lines of the pixel array.

10. The method of claim 9, further comprising asserting, by a first pixel of the array in response to a detected event, either:

a column readout request on the column readout request line of the column of the first pixel, and a row readout request on the row readout request line of the row of the first pixel in response to an acknowledgement signal on the acknowledgement column line; or a row readout request on the row readout request line of the row of the first pixel, and a column readout request on the column readout request line of the column of the first pixel in response to an acknowledgement signal on the acknowledgement column line.

11. The method of claim 10, further comprising deactivating, by the first pixel of the array, the column and row readout requests in response to the acknowledgement signals being asserted on the acknowledgement column and row lines.

12. The method of claim 8, further comprising generating, by a pattern generation circuit of the row readout circuit, a bit pattern indicating the row of the sub-group on which the event occurred.

13. An event-driven sensor comprising:

a pixel array;

a column readout circuit coupled to column output lines of the pixel array, the column readout circuit comprising, for each of the column output lines, a column register cell coupled to the column output, the column register cells being coupled in series with each other to propagate a first token, wherein each column register cell is configured to activate a column event output signal when it receives the first token while an event is indicated on the column output line; and a row readout circuit coupled to row output lines of the pixel array, the row readout circuit comprising, for each of the row output lines, or for each of a plurality of sub-groups of the row output lines, a row register cell coupled to the row output line or lines, the row register cells being coupled in series with each other to propagate a second token, wherein each row register cell is configured to activate a row event output signal when it receives the second token while an event is indicated on the row output line, or on one of the row output lines of the sub-group;

wherein each column output line is coupled in a daisy-chain to each of the pixels of its column, and each row output line is coupled in a daisy-chain to each of the pixels of its row.

* * * * *